(12) United States Patent
Mates

(10) Patent No.: US 8,132,255 B2
(45) Date of Patent: Mar. 6, 2012

(54) GENERATING A CHALLENGE RESPONSE IMAGE INCLUDING A RECOGNIZABLE IMAGE

(75) Inventor: John W. Mates, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 714 days.

(21) Appl. No.: 12/140,207

(22) Filed: Jun. 16, 2008

(65) Prior Publication Data

US 2009/0313694 A1    Dec. 17, 2009

(51) Int. Cl.
*G06F 7/04* (2006.01)

(52) U.S. Cl. .......... 726/21; 382/209; 382/298; 382/305; 726/4; 726/17; 709/206; 380/255; 713/170; 713/182

(58) Field of Classification Search .................... 726/21, 726/4, 17; 382/209, 298, 305; 713/170, 713/182; 380/255
See application file for complete search history.

(56) References Cited

U.S. PATENT DOCUMENTS

| | | | |
|---|---|---|---|
| 5,371,627 A * | 12/1994 | Baccei et al. ................. | 359/462 |
| 6,006,328 A * | 12/1999 | Drake ............................. | 726/23 |
| 7,200,576 B2 * | 4/2007 | Steeves et al. .................. | 705/64 |
| 7,552,467 B2 * | 6/2009 | Lindsay ............................ | 726/5 |
| 7,565,330 B2 * | 7/2009 | Steeves et al. .................. | 705/75 |
| 7,577,994 B1 * | 8/2009 | Sobel et al. ...................... | 726/21 |
| 7,716,661 B2 * | 5/2010 | Paul et al. ....................... | 717/173 |
| 2003/0103136 A1 * | 6/2003 | Stanton ............................ | 348/49 |
| 2004/0199597 A1 * | 10/2004 | Libbey et al. .................. | 709/207 |
| 2005/0060554 A1 | 3/2005 | O'Donoghue | |
| 2005/0193208 A1 * | 9/2005 | Charrette et al. ............. | 713/182 |
| 2005/0239447 A1 * | 10/2005 | Holzman et al. ........... | 455/414.3 |
| 2006/0230395 A1 * | 10/2006 | Paul et al. ....................... | 717/173 |
| 2006/0287963 A1 * | 12/2006 | Steeves et al. .................. | 705/64 |
| 2007/0043681 A1 * | 2/2007 | Morgan et al. .................. | 705/67 |
| 2007/0069008 A1 * | 3/2007 | Klein et al. ..................... | 235/379 |
| 2007/0143624 A1 * | 6/2007 | Steeves ......................... | 713/182 |
| 2007/0156592 A1 * | 7/2007 | Henderson ...................... | 705/51 |
| 2007/0174628 A1 * | 7/2007 | Charrette et al. ............. | 713/182 |
| 2007/0179905 A1 * | 8/2007 | Buch et al. ....................... | 705/75 |
| 2007/0201745 A1 * | 8/2007 | Wang et al. .................... | 382/181 |
| 2007/0226804 A1 * | 9/2007 | Somkiran et al. ............... | 726/24 |

(Continued)

FOREIGN PATENT DOCUMENTS

EP     1422589 A1    5/2004

(Continued)

OTHER PUBLICATIONS

Chang, P. and G. Richards, "Single Image Random Dot Stereograms (SIRDS) Pages", [online], updated Aug. 23, 2004, [retrieved on Jun. 16, 2008], retrieved from the Internet at <URL: http://www.nottingham.ac.uk/~etzpc/sirds.html;>, 7 pp.

(Continued)

*Primary Examiner* — April Shan
(74) *Attorney, Agent, or Firm* — Barre Law Firm, PLLC

(57) ABSTRACT

Provided are a method, system, and article of manufacture for generating a challenge response image including a recognizable image. A challenge image is generated including random elements and a recognizable image. The challenge image is transmitted to a recipient. Recipient input associated with the transmitted challenge image is received. A determination is made as to whether the received recipient input matches a descriptor associated with the recognizable image in the challenge image. Indication is made that the recipient correctly identified the recognizable image.

17 Claims, 5 Drawing Sheets

U.S. PATENT DOCUMENTS

| | | | |
|---|---|---|---|
| 2007/0250920 A1* | 10/2007 | Lindsay | 726/7 |
| 2007/0277224 A1* | 11/2007 | Osborn et al. | 726/2 |
| 2008/0049969 A1* | 2/2008 | Koziol | 382/100 |
| 2008/0063276 A1* | 3/2008 | Vincent et al. | 382/182 |
| 2008/0066014 A1* | 3/2008 | Misra | 715/846 |
| 2008/0072293 A1* | 3/2008 | D'Urso | 726/4 |
| 2008/0109657 A1* | 5/2008 | Bajaj et al. | 713/168 |
| 2008/0127302 A1* | 5/2008 | Qvarfordt et al. | 726/2 |
| 2008/0133321 A1* | 6/2008 | Pennock et al. | 705/10 |
| 2008/0133347 A1* | 6/2008 | Josifovski et al. | 705/14 |
| 2008/0209223 A1* | 8/2008 | Nandy et al. | 713/185 |
| 2008/0320554 A1* | 12/2008 | Baker et al. | 726/2 |
| 2009/0012855 A1* | 1/2009 | Jamal et al. | 705/14 |
| 2009/0094687 A1* | 4/2009 | Jastrebski et al. | 726/6 |
| 2009/0113294 A1* | 4/2009 | Sanghavi et al. | 715/269 |
| 2009/0138723 A1* | 5/2009 | Nyang et al. | 713/182 |
| 2009/0235327 A1* | 9/2009 | Jakobsson et al. | 726/2 |
| 2009/0307765 A1* | 12/2009 | Mardikar et al. | 726/7 |
| 2010/0031330 A1* | 2/2010 | Von Ahn et al. | 726/5 |

FOREIGN PATENT DOCUMENTS

| | | |
|---|---|---|
| JP | 2007-525767 A | 9/2007 |
| JP | 2008-262549 A | 10/2008 |
| WO | 2005083545 A1 | 9/2005 |
| WO | 2007085824 A2 | 8/2007 |

OTHER PUBLICATIONS

Claburn, T., "Yahoo's CAPTCHA Security Reportedly Broken", [online], Jan. 17, 2008, [retrieved on Jun. 16, 2008], retrieved from the Internet at <URL: http://www.informationweek.com/story/showArticle.jhtml?articleID=205900620>, 1 pg.

Dembo, S., "Captcha 2.0: Cats, Dogs and eBooks, Oh My!", [online], Sep. 14, 2007, [retrieved on Apr. 3, 2008], retrieved from the Internet at <URL: http://www.teach42.com/2007/09/14/captcha-20-cats-dogs-and-ebooks-...>, 3 pp.

Golle, P., "Machine Learning Attacks Against the ASIRRA CAPTCHA", Feb. 28, 2008, 9 pp.

Slashdot, "Next-Generation CAPTCHA Exploits the Semantic Gap", [online], Apr. 23, 2008, [retrieved on Apr. 23, 2008], retrieved from the Internet at <URL: http://tech.slashdot.org/article.pl?sid=08/04/23/0044223>, 16 pp.

Websense, "Google's CAPTCHA Busted in Recent Spammer Tactics", [online], Feb. 22, 2008, [retrieved Jun. 16, 2008], retrieved from the Internet at <URL: http://securitylabs.websense.com/content/Blogs/2919.aspx>, 9 pp.

Wikipedia, "Autostereogram", [online], [retrieved on Apr. 28, 2008], retrieved from the Internet at <URL: http://en.wikipedia.org/w/index.php?title=Autostereogram&printable=yes>, 9 pp.

Wikipedia, "CAPTCHA", [online], [retrieved on Apr. 28, 2008], retrieved from the Internet at <URL: http://en.wikipedia.org/w/index.php?title=CAPTCHA&printable=yes>, 5 pp.

Wikipedia, "Random Dot Stereogram", [online], [retrieved on Apr. 27, 2008], retrieved from the Internet at <URL: http://en.wikipedia.org/w/index.php?title=Random_dot_stereogram&printable=yes>, 2 pp.

Wikipedia, "Stereopsis", [online], [retrieved on Apr. 28, 2008], retrieved from the Internet at <URL: http://en.wikipedia.org/w/index.php?title=Stereopsis&printable=yes>, 3 pp.

Yamazaki, M. "An Easy Method of Making Random-Dot Stereogram Using Microsoft Word", [abstract], NII— Electronic Library Service, vol. XXIX, 2004, p. 39.

Notice of Preliminary Rejection for KR Application No. 10-2009-52941, dated Jan. 11, 2011, 10 pp. [With Translation of OA and Pending Claims] [77209KR (OA1)].

Response to Official Communication for EP Application No. 09251546.9, dated Apr. 22, 2010, 12 pp. [77.209EP (ROA1)].

Voluntary Amendment for CN Application No. 200910149331.0, dated Apr. 21, 2010, 10 pp. [with Translation of Claims as Filed] [77209CN (VoluntaryAmend)].

Daddydave, "Human or Bot—Let's Moderate", [online], May 31, 2006, [Retrieved on Aug. 26, 2009], Phydeaux3, Blog, Retrieved from the Internet at <URL: http://phydeaux3.blogspot.com/2006/04/human-or-bot-lets-moderate.html?showComment=1144036800000>, 4 pp.

Doa, "Captcha's Gone Wild!", [online] Jul. 30, 2007, [Retrieved on Aug. 26, 2009], The Daily WTF, Forums, Retrieved from the Internet at <URL: http://forums.the dailywtf.com/forums/p/6533/126910.aspx>, 6 pp.

Edzo, "Spambot Cracks Live Hotmail CAPTCHA", [online] Apr. 15, 2008, [Retrieved on Aug. 26, 2009], ARS Technica, Openforum, News and Discussion, Blog, Retrieved from the Internet at <URL: http://episteme.arstechnica.com/eve/foirums/a/tpc/f/174096756/m/678000861931/p/2>, 6 pp.

Office Action 1 for EP Application No. 09 251 546.9-1245, dated Oct. 13, 2009, 3 pp. [77.209EP (OA1)].

Chinese Office Action received for Application No. 200910149331.0 mailed on Jun. 29, 2011, 10 pages of English translation and 13 pages of Office Action, 23 pages.

"The problem of CAPTCHA is, in summary, a simple contradiction in principle: When the strength is increased (when the readability is reduced), it becomes more unreadable for human too", B. M. F. Clip, Mar. 17, 2008, Document available at- http://clip.buru.jp/page/995.

Kentarou, "CAPTCHA is an inane plan, cnet Japan, Asahi Interactive, Inc.", Feb. 28, 2011, Document available at- http://japan.cnet.com/blog/kenn/2008/02/28/entry_25005627/.

Office Action received for Japanese Patent Application No. 2009-141898, mailed on Sep. 27, 2011, 6 pages of English translation, and 5 pages of Office Action, 11 pages.

Notice of Preliminary Rejection received for Korean Application No. 10-2009-52941,mailed on Oct. 31, 2011, 4 pages of the Notice and 4 pages of English Translation, 8 pages.

"Human or Bot- Let's Moderate" Apr. 2, 2006, Document available at http://phydeaux3.blogspot.com/2006/04/human-or-bot-lets-moderate.html; 3 pages.

European Search Report issued for EP Application No. 11008005.8-1245 mailed on Nov. 17, 2011; 4 pages.

* cited by examiner

Sent Image Log Entry

GENERATING A CHALLENGE RESPONSE IMAGE INCLUDING A RECOGNIZABLE IMAGE

BACKGROUND OF THE INVENTION

1. Field of the Invention

The present invention relates to a method, system, and article of manufacture for generating a challenge response image including a recognizable image.

2. Description of the Related Art

A "CAPTCHA" (completely automated public Turing test) is a challenge-response test used to determine whether the responder to the CAPTCHA test is human, i.e., a test of the humanness of the receiver as opposed to a machine, such as an automated process or "bot". This determination may be made in the context of determining whether to grant access to a resource guarded by the CAPTCHA to limit access to human users. Although the CAPTCHA challenge can be performed with respect to a remote person, the process typically involves a remote machine automatically asking a computer user or test recipient to complete a simple test, such as recognizing an alpha-numeric string presented on the recipient's computer screen. Typically that string is heavily distorted in such a way as to make machine recognition very difficult but recognition by a human is relatively easy.

The presumption is that because of the difficulty a computer process would have determining the string included in the image, a computer process is unlikely to solve the CAPTCHA, so that the recipient entering the correct solution is presumed to be human. CAPTCHAs can be deployed to protect systems vulnerable to e-mail spam, such as commercial webmail services, to stop automated posting to blogs, forums and wikis, whether as a result of commercial or political promotion, harassment and/or vandalism, to ensure that the user accessing information or a computer program is human, etc. CAPTCHAs may also be used to ensure that a response to an Internet poll is from a human to prevent the use of automated processes, referred to as "bots", from manipulating the results.

Recently CAPTCHAs have been hacked, allowing automated processes to present the correct answer in response to the CAPTCHA image to present themselves as a human recipient, and in some cases gain access to the resource guarded by the CAPTCHA challenge-response test. For instance, many web sites reuse a set of CAPTCHA images. A hacker trying to use automated processes to get around the CAPTCHA may maintain a library of CAPTCHA images, such that when a CAPTCHA image is detected, the automated process or bot looks up the CAPTCHA image in the library to determine the response to return to the CAPTCHA challenge.

DETAILED DESCRIPTION

Figure 1:
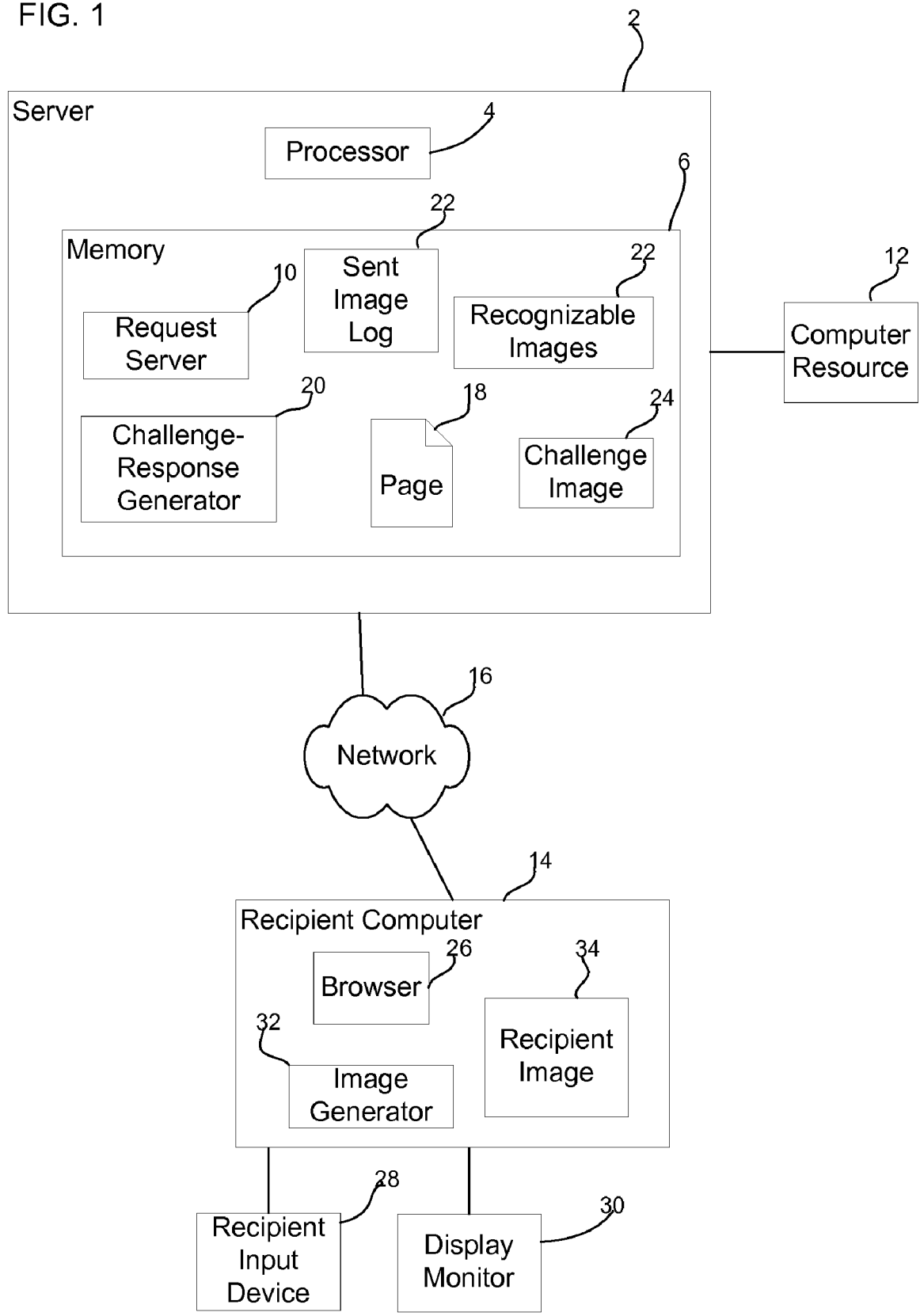
FIG. 1 illustrates an embodiment of a computing environment.

FIG. 1 illustrates an embodiment of a computing environment. A computer 2 includes one or more processors 4 and a memory 6 in which programs are loaded for execution by the processor 4. The processor 4 executes a request server 10 program to handle requests for a computer resource 12. The request server 10 may comprise a web server or hypertext transfer protocol (HTTP) server to process requests from client computers, such as recipient computer 14, over a network 16. The computer resource 12 may comprise information a user wants to access in a computer readable storage medium within the computer 2 or in a storage device external to the computer 2. Alternatively, the computer resource 12 may comprise computer resources available to users, such as computational and processing resources to perform user requested operations, such as email, etc., computer programs, online poll or questionnaire, blog at which comments can be posted, storage resources to store user data, an output device such as a printer, or any other computer operable device, program or service. The request server 10 may return pages 18 in response to requests from recipient computer 14 over the network 16. The network may comprise a Local Area Network (LAN), the Internet, an Intranet, etc.

A challenge-response generator 20 generates a challenge image 24 including a representation of at least one of a plurality of available human recognizable images 24 which may be returned to the recipient computer 14 in a page 18, e.g., a Hypertext Markup Language (HTML), Extensible Markup Language (XML), page. If the recipient computer 14 returns input correctly identifying the human recognizable image 24, then the request server 10 may grant the recipient computer 14 access to the computer resource 12. The challenge-response generator 20 may randomly select one of a plurality of human recognizable images 22 to include in challenge image 24. In preferred embodiments, the human recognizable images 22 may be understood by a human recipient, but are intended to be difficult for a computer to recognize to ensure that a human is likely answering the challenge test of the challenge response. For instance, the recognizable image 22 may comprise an alpha-numeric string, word, image of a readily identifiable object, e.g., animal, device, location, etc. In this way, the challenge image 24 functions as a CAPTCHA.

The challenge image 24 may comprise a single image or a plurality of images viewed together so that the recognizable image 22 is discernable to human visual perception, but cannot be determined by a computer.

The challenge-response generator 20 may log sent challenge images 24 in a sent image log 26. The challenge-response generator 20 further maintains descriptors for each recognizable image 22. The challenge-response generator 20 may be implemented as software in the memory 22 executed by the processor 4 as shown in FIG. 1 or as a separate hardware device.

The recipient computer 14 includes a browser 26, such as an Internet Web browser, to submit request for pages 18 to the request server 10 and display and render pages 18 returned by the request server 10, which may include a challenge image 24, on an attached monitor 30. The recipient computer 14 may utilize an input device 28 to interact with the browser 14 to submit requests for pages 18 and render in display monitor 30 returned pages 18, some of which may include a challenge image 24. The input device 28 may comprise a mouse, keyboard, pen-stylus, microphone, touch screen, etc., controlled by the recipient of the challenge-response test to provide user input to a computer program. The processor 4 may comprise one or more central processing units (CPUs) and the memory 6 may comprise one or more non-volatile or volatile memory devices. The recipient computer 14 may comprise a desktop, laptop, telephony device, personal digital assistant (PDA) or other suitable computational device known in the art.

The recipient computer 14 may optionally include an image generator 32 to generate a recipient image 34 to transmit to the challenge-response generator 20 in the server 2 to use to form the challenge image 24. The image generator 32 may be implemented as a software program executed by a processor in the recipient computer or, alternatively, comprise a secure hardware device coupled to the recipient computer14.

Figure 2:
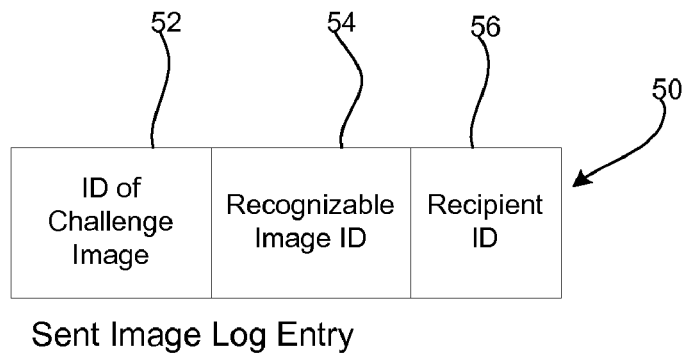
FIG. 2 illustrates an embodiment of a sent image log entry.

FIG. 2 illustrates an embodiment of a sent image log entry 50 in the sent image log 22 for a generated challenge image 24 transmitted to the recipient computer 14, including an identifier (ID) of the challenge image 52 identifying the one or more challenge images sent to a recipient computer 14, a recognizable image identifier (ID) 54 of one human recognizable image included in the challenge image 52, and a recipient identifier (ID) 56 of the recipient computer 14 initiating the request for the computer resource 12 for which the challenge image 24 is generated.

Figure 3:
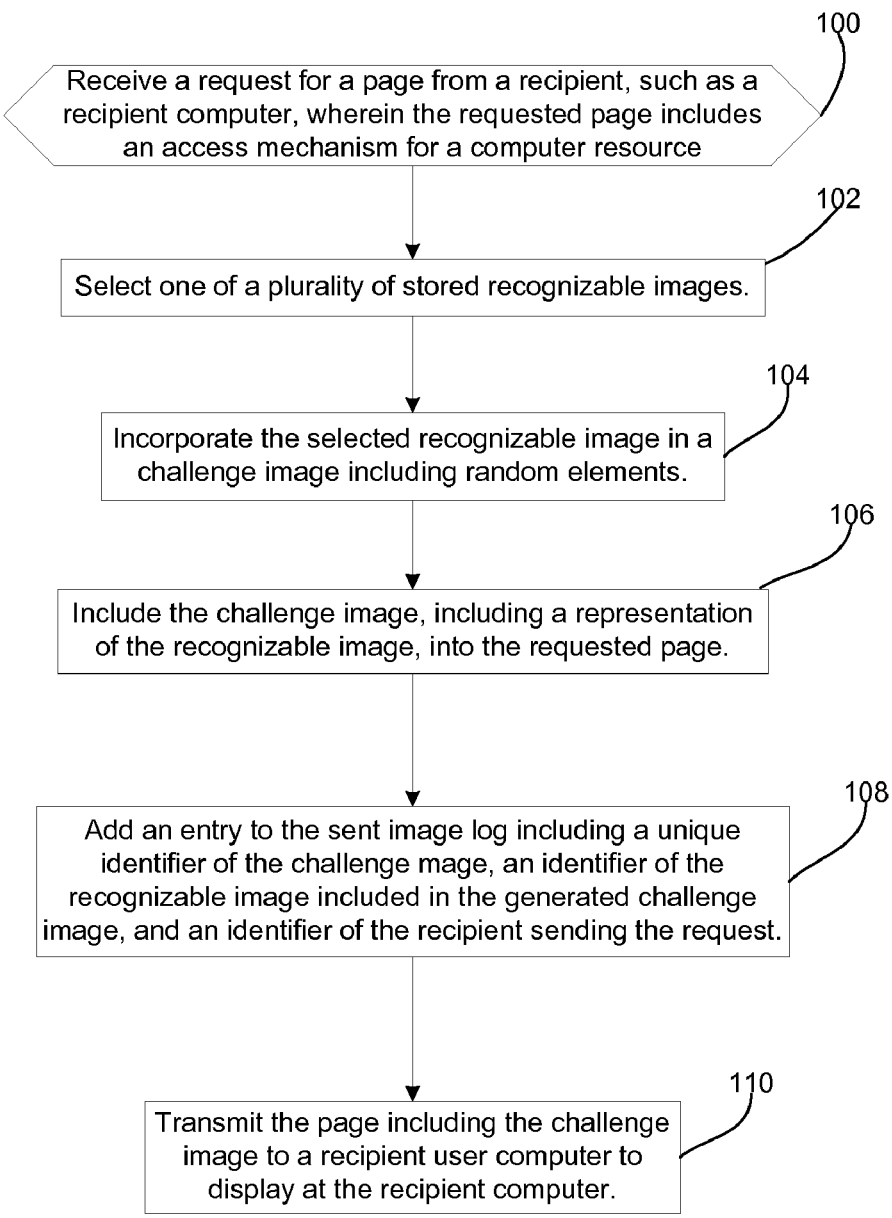
FIGS. 3, 5, and 6 illustrate embodiments of operations to generate a challenge image including a recognizable image.

FIG. 3 illustrates an embodiment of a challenge-response procedure implemented in program components of the server 2, such as the request server 10 and challenge response generator 20, to determine whether the recipient of the challenge image 24 comprises a human as opposed to a computer process. Control begins at block 100 when the request server 10 receives (at block 100) a request for a page 18 from the recipient computer 14 or recipient, which request may be generated and transmitted from the browser 26. The requested page 18 may include an access mechanism for a computer resource 12. The access mechanism may comprise a description of the computer resource 12 and a hypertext link or logon field to allow the recipient to select to access the computer resource 12. In one embodiment, the server 2 may automatically include a challenge image 12 in the page 18 returned to the recipient computer 14 to enable the recipient at the recipient computer 14 to selectively determine whether to respond to the challenge image 24 to access the resource 12. Alternatively, the challenge image 24 may be returned after the recipient selects to access the computer resource 12.

Upon receiving (at block 100) the request, the challenge response generator 20 is invoked by the request server 10, or some other function, to generate the challenge image 24. Upon being invoked, the challenge-response generator 20 selects (at block 102) one of a plurality of the stored recognizable images 22 and incorporates (at block 104) the selected recognizable image 22 in a challenge image 24 including random elements. The elements may comprise dots, image fragments, graphic symbols, one or more geometric shapes, or any other displayable items. The challenge-response generator 20 may generate a new challenge image 24 having random elements in response to each request for the page 18 from a recipient computer 14 or recipient, or use the same challenge image and the same or different recognizable images 22 for different challenge requests. Alternatively, multiple recognizable images 22 may be selected to include in the challenge image 24. The random elements in the challenge image 24 may be generated by a random process to ensure that each instance of a generated challenge image 24 includes a different number and arrangement of the elements. To include or incorporate the selected recognizable image(s) 22 in the challenge image 24, the challenge-response generator 20 may correlate elements, e.g., dots, in the random image to an outline of the selected recognizable image 22, such that the recognizable image may be visually detected by human perception of the challenge image 24. In certain embodiments, the challenge image 24 may comprise a stereogram, e.g., three dimensional stereogram, autostereogram, single image random dot stereogram (SIRDS), random dot stereogram (RDS), etc. The challenge image 24 may be generated such that the recognizable image 22 within the challenge image 24 may be discernible to a human visual perception process, e.g., stereopsis, but very difficult for an automated computational processes to detect.

The challenge-response generator 20 or request server 10 may include (at block 106) the challenge image 24, including a representation of the recognizable image 22, into the requested page 18. A sent image log entry 50 may be added (at block 108) to the sent image log 26, which includes a unique identifier 52 of the generated challenge image 24, an identifier of the recognizable image 22 included in the generated challenge image 24, and an identifier 54 of the recipient sending the request. The request server 10 transmits (at block 110) the page 18 including the challenge image 24 to the recipient computer 14 to display at the recipient computer monitor 30.

Yet further, the challenge image 24 may comprise a challenge video, or dynamically moving perceived objects presenting stereogram images in a video, in which the recognizable image or images are discernible to human visual perception, but very difficult for a computer process to discern. The challenge image 24 may further comprise a random dot image including embedded pieces of one or more recognizable images.

The user of the recipient computer 14 upon perceiving the challenge image 24 may perceive the recognizable image 22 and then return a response including a description of the image to obtain access to the computer resource 12. In additional embodiments, the recipient may be requesting access to different types of resources, such as tangible goods, commodities, items, etc.

Figure 4:
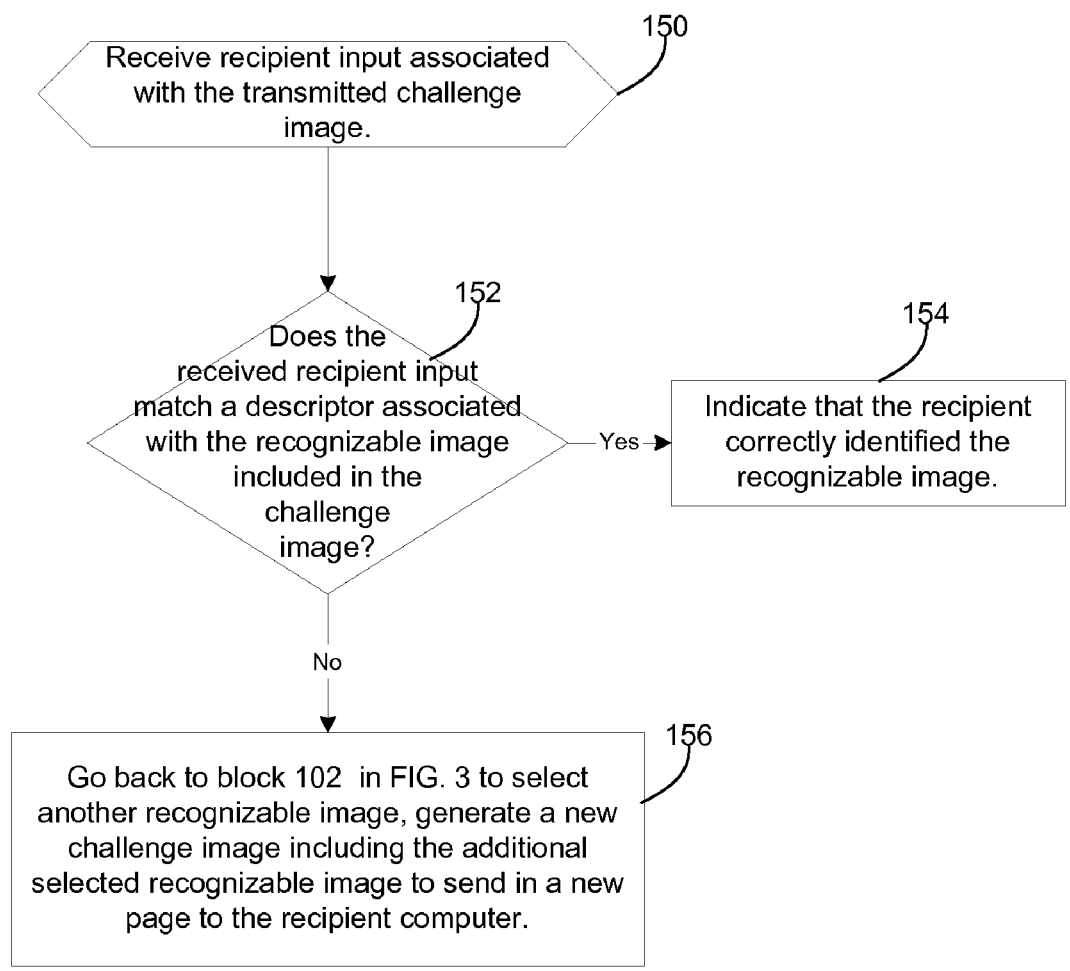
FIG. 4 illustrates an embodiment of operations to process a response to the challenge image.

FIG. 4 illustrates an embodiment of operations performed by the request server 10, or other program module, to process a recipient (of the challenge image) response to the challenge image 24. Upon receiving (at block 150) recipient input from the recipient computer 14 associated with the transmitted challenge image 24, such as a description of the recognizable image 22 embedded in the challenge image 34, the request server 10 determines (at block 152) whether the received recipient input matches a descriptor associated with the recognizable image 22 embedded in the transmitted challenge image 24. For instance, the recipient input response may be transmitted with an identifier of the challenge image 24. In such case, the request server 10 may lookup the sent image log entry 50 for which the recipient input description is received to determine whether the recipient provided description matches a description maintained for the recognizable image 54 identified in the sent image log entry 50.

If (at block 152) the recipient input matches the descriptor maintained for the transmitted recognizable image 22, then the request server 10 indicates (at block 154) that the recipient correctly identified the recognizable image. The request server 10 may further authorize the recipient computer 14 to access a guarded resource 12. If (at block 152) the user input of the description does not match a description maintained for the recognizable image 22, then control proceeds to block 102-110 to invoke the challenge-response generator 20 to select (at block 156) another recognizable image, generate a new challenge image 24 including the additional selected recognizable image 22 to send in a new page 18 to the recipient computer to retry the challenge-response. The server 2 may only regenerate the challenge image 24 a limited number of times before denying access to the recipient computer 14 for a timeout period or after further verification.

Figure 5:
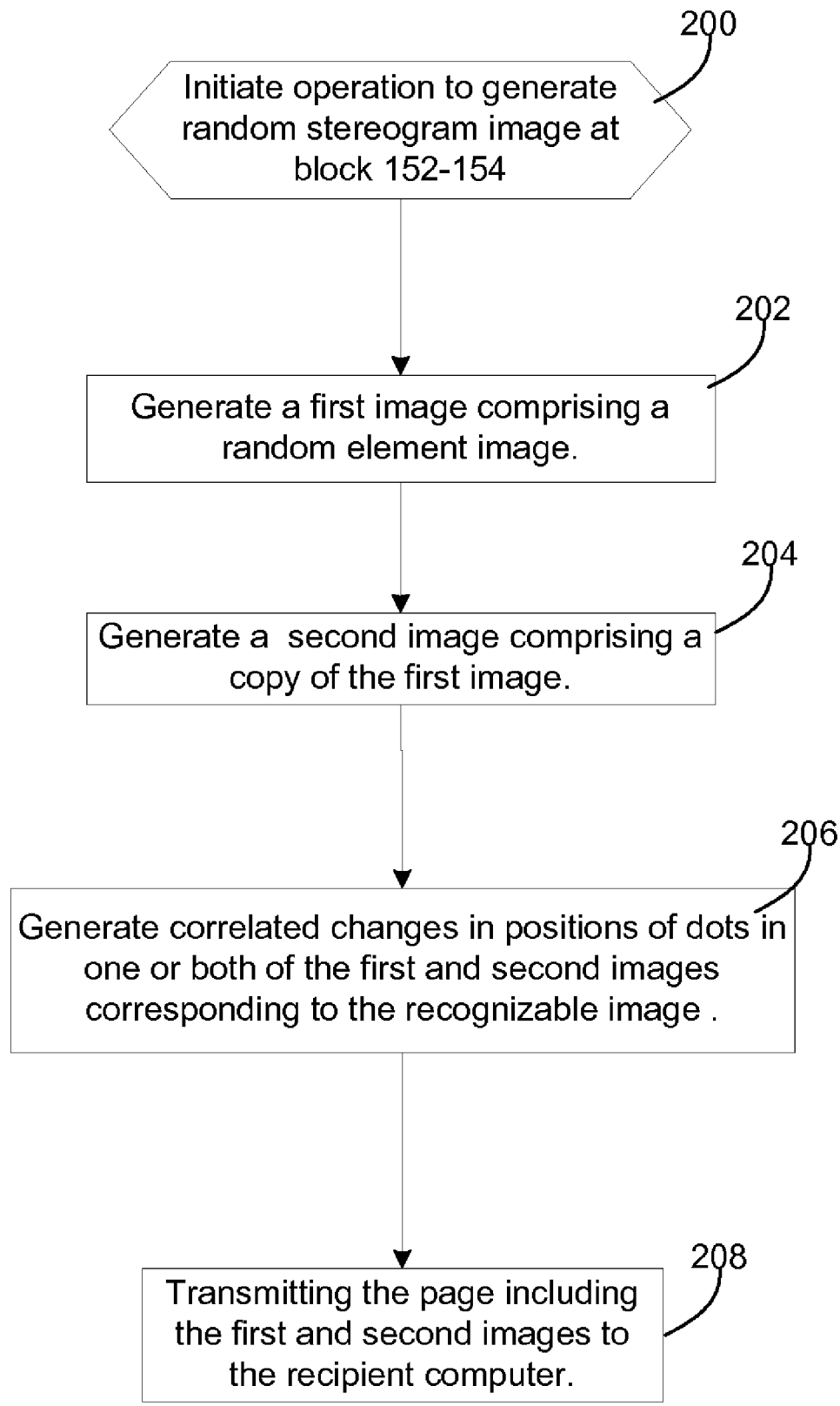

FIG. 5 illustrates an embodiment of operations performed by the challenge-response generator 20 to generate a challenge image 24 comprising a pair of random stereogram images, such that a recognizable image 22 embedded in one or both of the random stereogram images can be detected by human visual perception only when viewing the two stereogram images together, either side-by-side or superimposed on one another. In certain embodiments, each of the images alone contain no information when viewed separately that would allow the recipient to determine the recognizable image that is discernible by human vision when viewed side-by-side (as in the stereogram) or interleaved (as in a SIRDS image) or integrated in any other such way that human vision can concurrently inspect both images together so as to visually discover the shared image not contained in any of the individual images. Upon initiating (at block 200) operations to generate pair (or other number) of random stereogram images, the challenge-response generator 20 generates (at block 202) a first image comprising random elements, such as a random dot image, and generates (at block 204) a second image comprising a copy of the first image. The challenge-response generator 20 generates (at block 206) correlated changes in positions of elements, e.g., dots, in one or both of the first and second random dot images corresponding to the recognizable image to include. In one embodiment, the recognizable image 22 may only be incorporated into one of the random dot images in a manner such that only when the first and second random images are viewed side-by-side can human visual perception discern the recognizable image. Alternatively, recognizable image 22 may be included in both of the random images in a manner such that only when the first and second random images are superimposed over one another can human visual perception discern the recognizable image 22. The request server 10 may transmit the page 18 including the first and second images to the recipient computer 14 to render in the browser 26 to enable the human user of the recipient computer 14 to discern the recognizable image and return a response of the image to the server 2 to verify.

In one embodiment, the first and second stereogram images generated according to the operations of FIG. 5 may be transmitted together to the browser 26 of the recipient computer 14. In an alternative embodiment, the server 2 may transmit the first image to the recipient computer 14 and only transmit the second image after receiving a request from the recipient computer after transmitting the first image. Transmitting the first and second images separately may improve security by preventing both images from being intercepted in the same transmission.

In one embodiment, the challenge image 24 comprises two random element (e.g., dot) stereograms of identical size, each of which in certain embodiments consists of random dots placed so the spatial distributions of the dots are strictly random and can contain no information when the images are separately viewed. In an alternative embodiment, the challenge image 24 comprises a single image which contains large amounts of information difficult for computers to read.

When a pair of images are used for the challenge image 24, no single image of an image group, whether in an autostereogram, RDS, SIRDs, etc., contains any information indicating the recognizable image in the absence of the other image(s). All images are required to be viewed concurrently to ascertain the recognizable image needed to pass the challenge response test. This facilitates security in embodiments where the images may be transmitted separately in separate transmissions. In a further embodiment, one image of a pair of the challenge image may be unique and maintained within a hardware device.

Figure 6:
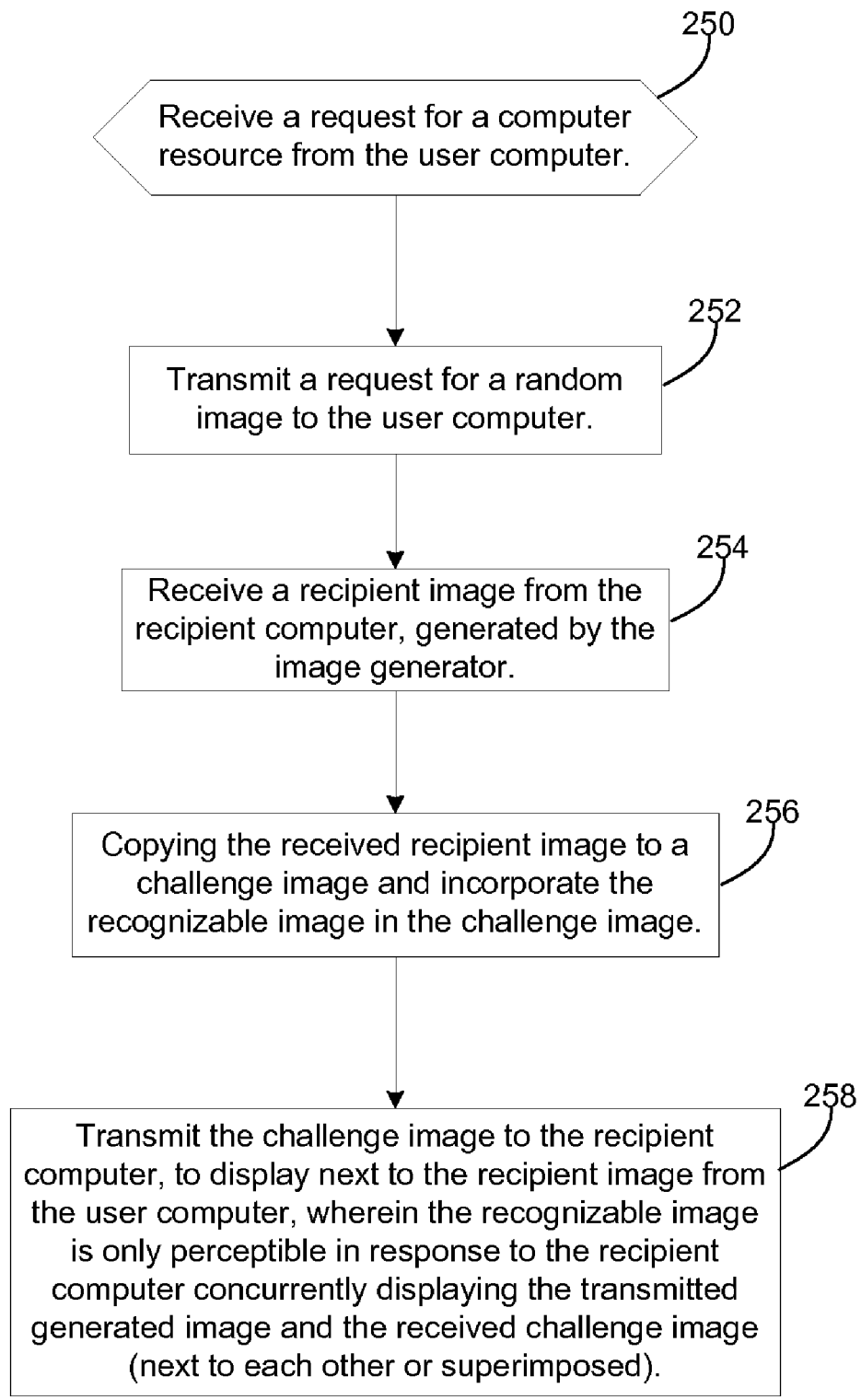

FIG. 6 illustrates an embodiment of operations implemented in the request server 10 and challenge-response generator 20 to generate a challenge image 24 based on a random dot image received from the recipient computer 14 image generator 32. Upon receiving (at block 250) a request for a computer resource 12 from the recipient computer 14, such as a computer patch for a product, the request server 10 transmits (at block 252) a request for a random element image to the recipient computer 14. Upon receiving (at block 254) a recipient image 34 from the recipient computer, generated by the image generator 32 for the recipient computer 14, the challenge-response generator 20 copies (at block 256) the received recipient image 34 to a challenge image 24 and incorporates the selected recognizable image 22 into the challenge image 24. In one embodiment, the recognizable image 22 is included in the challenge image 24 so that if the recipient computer 14 browser 26 displays the recipient image 34 with the challenge image 24, the recognizable image 22 in the challenge image 24 may be visually perceived by a human user of the computer 14. In one embodiment, the recognizable image 22 may be perceived when displaying the challenge image 24 and recipient image 34 next to each other and, in another embodiment, when superimposing one the challenge image 24 and recipient image 34 on one another. The challenge-response generator 20 transmits (at block 258) the challenge image 24 to the recipient computer 14, to display with the recipient image 34 from the recipient computer 14

Described embodiments provide a challenge-response utilizing a challenge image that includes a recognizable image readily discernible by human visual perception, but very difficult for a computer to discern. The challenge image may include random elements such that the challenge image as a whole is unique with respect to previously generated challenge images to test whether the recipient of the challenge image test is a person or machine. This random nature of the generated challenge image improves security from automated processes attempting to overcome the challenge image.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

In an alternative embodiment, the recipient of the challenge image may comprise a person that receives a printout of the challenge image, or pair of challenge images to be viewed together, and may enter recipient input identifying the challenge image to the server 2. In a further embodiment, the operations described with respect to the challenge response generator 20 for generating the challenge image 24 and querying a recipient may be performed by a human operator who prepares the challenge image 24 and reviews the recipient response to determine if the recipient correctly identified the recognizable image.

In described embodiments, the recognizable image embedded in the challenge image was detected by human visual perception. In an alternative embodiment, the challenge image may comprise an audio file that is detected by human audio perception and difficult for a computer automated process to detect. In this way, the described challenge embodiments may be extended to additional senses, such as auditory.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

at a source computing device, receiving, from a recipient computing device, a request for a computer resource;

at the source computing device, after receiving the request for the computer resource from the recipient computing device, receiving a recipient image from the recipient computing device, wherein the recipient image comprises a two-dimensional arrangement of random elements;

automatically generating a challenge image based on a recognizable image and the recipient image, wherein the challenge image comprises a stereogram with first and second images, each of which includes random elements, and wherein the first and second images are configured to allow a human viewer to perceive the recognizable image as a result of stereopsis only when the human viewer sees the first and second images together;

transmitting the challenge image from the source computing device to the recipient computing device;

receiving, from the recipient computing device, recipient input associated with the transmitted challenge image;

automatically determining, at the source computing device, whether the received recipient input signifies correct recognition of the recognizable image; and in response to a determination of correct recognition of the recognizable image, automatically allowing the recipient computing device to access the computer resource;

wherein the operation of automatically generating the challenge image comprises using the recipient image to generate the second image by changing positions of multiple random elements in the second image, relative to the recipient image, based on the recognizable image, wherein the changes of position are adapted to cause the recognizable image to appear to the human viewer when the recipient image and the second image are observed together at the same time; and wherein the operation of transmitting the challenge image comprises transmitting the second image to the recipient computing device.

2. The method of claim 1, wherein the operation of generating the challenge image comprises:
selecting one of a plurality of stored recognizable images; and
automatically generating the challenge image at the source computing device, based on the selected recognizable image.

3. The method of claim 1, further comprising:
receiving a request for a page from the recipient computing device, wherein the requested page includes an access mechanism for the computer resource;
including the challenge image into the requested page, wherein transmitting the image comprises transmitting the requested page including the challenge image.

4. The method of claim 1,
wherein the operation of automatically generating the challenge image is performed in response to receipt of the recipient request from the recipient computing device; and
further comprising generating different challenge images in response to receiving different recipient requests, wherein each different challenge image comprises a different stereogram.

5. The method of claim 1, wherein the stereogram of the challenge image is configured to allow the human viewer to perceive the recognizable image as a three dimensional image in space when the human viewer sees the stereogram.

6. The method of claim 1, wherein the challenge image includes randomly distributed pieces of the recognizable image.

7. The method of claim 1, wherein the stereogram of the challenge image comprises a random dot autostereogram.

8. The method of claim 1, wherein the first and second images are configured to reveal the recognizable image only when the first and second images are superimposed.

9. The method of claim 1, wherein the first and second images are configured to reveal the recognizable image when the first and second images are displayed next to each other.

10. The method of claim 1, further comprising:
receiving a request for a product patch from the recipient computing device; and
transmitting a request for the recipient image to the recipient computing device in response to the request for the product patch, wherein the recipient input is received after transmitting the challenge image.

11. The method of claim 1, wherein the challenge image comprises a first challenge image and the recognizable image comprises a first recognizable image, the method further comprising:
selecting a second recognizable image in response to a determination of incorrect recognition of the first recognizable image;
generating a second challenge image, based on the recipient image and the second recognizable image, wherein the second challenge image is configured to cause the second recognizable image to appear to the human viewer when the second challenge image and the recipient image are observed together at the same time and next to each other; and
transmitting the second challenge image to the recipient computing device for display next to the recipient image.

12. A data processing system operable to communicate with a recipient computing device, the data processing system comprising:
a central processing unit;
a non-transitory computer readable medium in communication with the central processing unit; and
instructions stored in the non-transitory computer readable medium which, when executed by the central processing unit, perform operations comprising:
receiving, from the recipient computing device, a request for a computer resource;
after receiving the request for the computer resource from the recipient computing device, receiving a recipient image from the recipient computing device, wherein the recipient image comprises a two-dimensional arrangement of random elements;
generating a challenge image based on a recognizable image and the recipient image, wherein the challenge image comprises a stereogram with first and second images, each of which includes random elements, and wherein the first and second images are configured to allow a human viewer to perceive the recognizable image as a result of stereopsis only when the human viewer sees the first and second images together;
transmitting the challenge image from the data processing system to the recipient computing device;
receiving, from the recipient computing device, recipient input associated with the transmitted challenge image;
automatically determining whether the received recipient input signifies correct recognition of the recognizable image; and
in response to a determination of correct recognition of the recognizable image, automatically allowing the recipient computing device to access the computer resource;
wherein the operation of automatically generating the challenge image comprises using the recipient image to generate the second image by changing positions of multiple random elements in the second image, relative to the recipient image, based on the recognizable image, wherein the changes of position are adapted to cause the recognizable image to appear to the human viewer when the recipient image and the second image are observed together at the same time; and
wherein the operation of transmitting the challenge image comprises transmitting the second image to the recipient computing device.

13. The data processing system of claim 12, wherein the instructions enable the data processing system to perform operations comprising:
automatically generating the challenge image in response to receipt of the request from the recipient computing device; and
generating different challenge images in response to receiving different recipient requests, wherein each challenge image comprises a different stereogram.

14. A non-transitory computer readable medium comprising:
instructions stored in the non-transitory computer readable medium, wherein the instructions, when executed by a data processing system, perform operations comprising:
receiving, from a recipient computing device, a request for a computer resource;
after receiving the request for the computer resource from the recipient computing device, receiving a recipient image from the recipient computing device, wherein the recipient image comprises a two-dimensional arrangement of random elements;

generating a challenge image based on a recognizable image and the recipient image, wherein the challenge image comprises a stereogram with first and second images, each of which includes random elements, and wherein the stereogram is configured to allow a human viewer to perceive the recognizable image as a result of stereopsis only when the human viewer sees the first and second images together;

transmitting the challenge image from the data processing system to the recipient computing device;

receiving, from the recipient computing device, recipient input associated with the transmitted challenge image;

automatically determining whether the received recipient input signifies correct recognition of the recognizable image; and in response to a determination of correct recognition of the recognizable image, automatically allowing the recipient computing device to access the computer resource;

wherein the operation of automatically generating the challenge image comprises using the recipient image to generate the second image by changing positions of multiple random elements in the second image, relative to the recipient image, based on the recognizable image, wherein the changes of position are adapted to cause the recognizable image to appear to the human viewer when the recipient image and the second image are observed together at the same time; and wherein the operation of transmitting the challenge image comprises transmitting the second image to the recipient computing device.

15. The non-transitory computer readable medium of claim 14, wherein the instructions, when executed by the data processing system, perform operations comprising:

automatically generating the challenge image in response to receipt of the request from the recipient computing device; and generating different challenge images in response to different recipient requests, wherein each challenge image comprises a different stereogram.

16. The non-transitory computer readable medium of claim 14, wherein the stereogram of the challenge image comprises a random dot autostereogram.

17. The data processing system of claim 12, wherein the stereogram of the challenge image comprises a random dot autostereogram.

* * * * *